July 1, 1958   T. O. HENRIKSON ET AL   2,841,294
HYDRAULIC DRAFT GEARS
Filed June 4, 1956   3 Sheets-Sheet 1

INVENTORS
Thor O. Henrikson
Roland A. Magnuson
BY
Ralph T. Bassett
Attorney

July 1, 1958  T. O. HENRIKSON ET AL  2,841,294
HYDRAULIC DRAFT GEARS

Filed June 4, 1956  3 Sheets-Sheet 3

INVENTORS
Thor D. Henrikson
Roland A. Magnuson
BY
Ralph L. Bassett
Attorney

United States Patent Office 2,841,294
Patented July 1, 1958

2,841,294
HYDRAULIC DRAFT GEARS

Thor O. Henrikson and Roland A. Magnuson, Seattle, Wash., assignors to Pacific Car and Foundry Company, Renton, Wash.

Application June 4, 1956, Serial No. 589,040

6 Claims. (Cl. 213—43)

This invention relates to a hydraulic draft gear primarily for use in connection with railroad car couplings or the like and suitable for interchange with standard friction or rubber type devices of the same type.

This invention is particularly directed to a shock-absorber of the type in which shock loads are absorbed in part by throttling of hydraulic fluid under pressure through orifices, and in part by compression of gas contained within an expansible chamber by hydraulic fluid under pressure.

It is a primary object of this invention to provide an improved draft gear of economical construction whose operational characteristics approach a theoretrical ideal more closely than shock absorbers previously known. Ideal characteristics include maximum shock absorption combined with a minimum peak force exerted upon the vehicle carriage frame or other structure which is to be protected. To attain this goal, it is necessary to absorb the applied shock load at a uniform rate, that is, to achieve a uniform application of force upon the vehicle carriage frame. This has previously been accomplished by throttling hydraulic fluid through orifices whose cross-sectional area is decreased as the displacement of the piston increases under application of a shock load, in such manner as to maintain a constant force upon the vehicle-attached members. However, previous applications of this principle have required the use of valve means, other than the piston and cylinder, in combination with the throttling orifices, thus increasing the complexity and cost of the draft gear.

It is one object of this invention to provide an energy absorption device comprising a piston and cylinder, which combine to force fluid contained in the cylinder through throttling orifices upon application of a load, and which further combine to decrease the cross-sectional areas of the throttling orifices in relation to their relative positions, and specifically in inverse relation to the piston displacement, without employing additional valve means.

It is a further object of this invention to provide pneumatic means for further absorption of shock loads transmitted by pressurized hydraulic fluid, for providing an expansible reservoir accommodating fluid transmitted through the throttling orifices, and for storing of potential energy to aid in rapidly returning the piston and cylinder to their extended relative positions under unloaded conditions.

Another object is the use of an expansible flexible gas-filled accumulator bag within a chamber in the piston receiving fluid from the throttling orifices, this accumulator bag being compressed by the entering fluid by an amount equal to the volume of piston displacement. When relative movement between the piston and cylinder ceases, the gas and fluid pressures are equal, after which the expansion of the accumulator bag forces rapid return of the fluid through the throttling orifices when the load is removed from the draft gear.

It is a further object of this invention to provide an improved fluid seal for a draft gear, comprising a flexible impervious membrane sealed to both the cylinder and the piston, so that leakage of fluid from the draft gear is positively prevented. In this connection, it is an additional object to provide means for maintaining a correct amount of fluid within an enclosure of the seal although the volume of the enclosure varies with the relative positions of the piston and cylinder.

In connection with the previously stated object of providing means to aid rapid return of the piston and cylinder to their extended relative positions upon removal of a load from the draft gear, it is a still further object of the invention to provide means producing a force opposing the force exerted by the fluid within the seal enclosure in a direction tending to resist the piston return, so that the resultant force tends to aid a rapid return. These means comprise an annular member associated with the piston and having opposite radial faces exposed to the seal enclosure and to a fluid-confining space of larger cross-sectional area provided in the cylinder, so that a larger force is exerted by the fluid in the cylinder space, tending to aid a rapid piston return.

Referring to the drawings:

Fig. 5 is a partial section taken on line 5—5 of Fig. 4.

Figure 1:
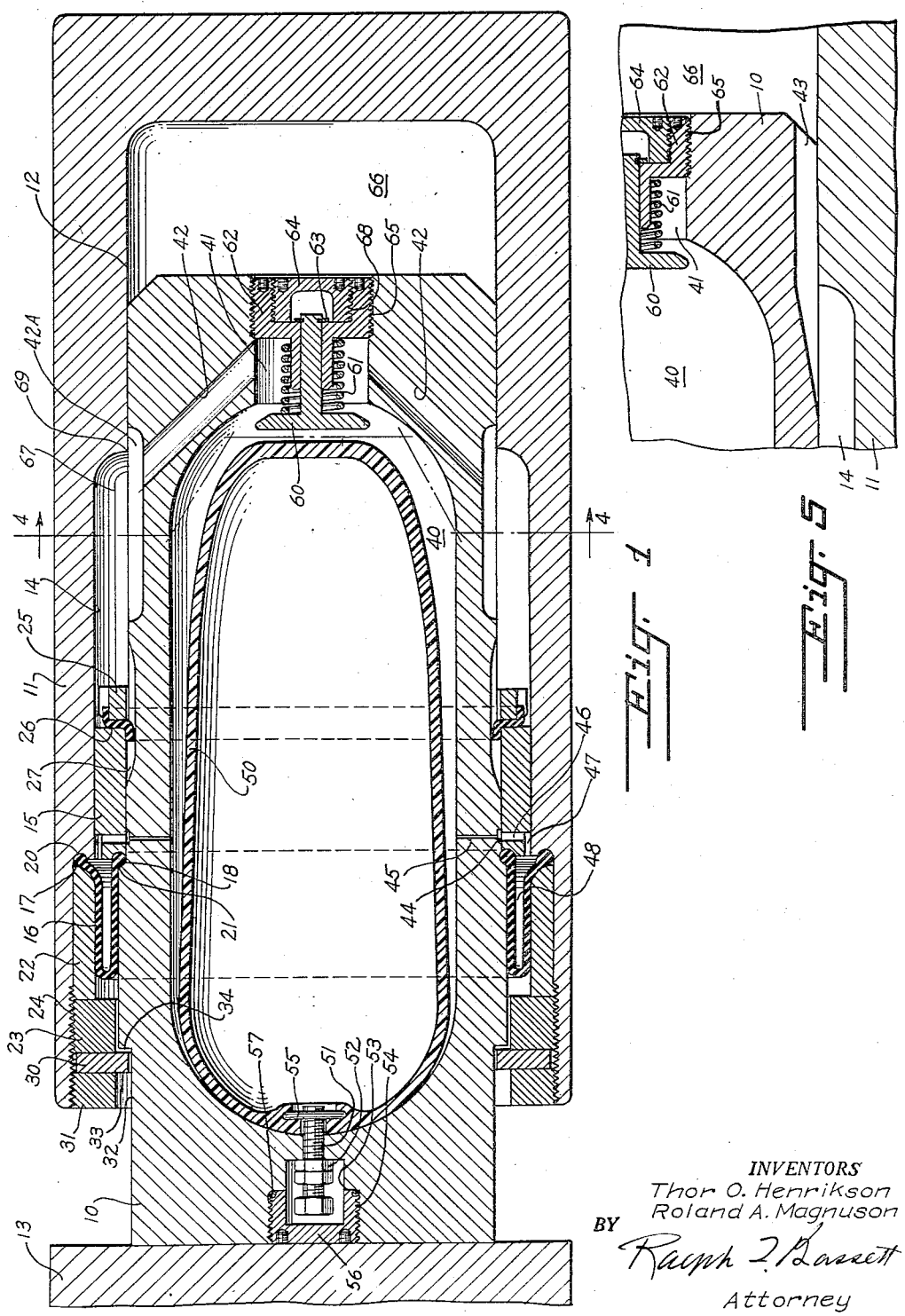
Fig. 1 is a longitudinal section taken along line 1—1 of Fig. 4 of a recommended embodiment of the present invention, with parts shown in normal or no-load position.

In Fig. 1, piston 10 is placed in axially-slidable relationship within the bore 12 of cylinder 11, and is affixed at one end to a conventional follower 13 associated with suitable means for applying compressional loads to the draft gear, or may be affixed to a vehicle undercarriage frame. Similarly, cylinder 11 may alternatively be rigidly secured to a vehicle undercarriage frame, or may be affixed to means for applying compressional loads, such as a coupler or yoke. Such load-applying means form no part of this invention and are not shown, but may be selected as adapted to various applications of the draft gear.

Cylinder 11 is also provided with a bore 14 of somewhat larger diameter than the piston 10. An annular bushing 15 is slidably received by bore 14 and is maintained in rigid assembly with piston 10 by means hereinafter described. Thus, bushing 15 and that portion of piston 10 which contacts bore 12 comprise the bearing surfaces which maintain the concentric relationship of piston 10 and cylinder 11 while permitting relative axial movement of these members.

An annular seal 16 is provided to prevent escape of hydraulic fluid from the draft gear, and for further objects to be described more fully hereinafter, and is formed at its inner and outer peripheries with lips 17 and 18. Seal 16 may preferably be made of nylon impregnated with a suitable flexible oil-resisting compound, or of any suitable material combining qualities of strength, flexibility, and imperviousness to hydraulic fluids. Lip 17 is seated in an annular groove 20 formed in the interior wall of cylinder 11, and lip 18 is seated upon an annular shoulder 21 formed on piston 10. Lip 17 is seated firmly in groove 20 by means of annular sleeve 22, which is secured by externally threaded nut 23 engaging internal threads 24 formed in cylinder 11. Lip 18 is seated firmly against shoulder 21 by means of castellated lock nut 25, castellated lock washer 26, and bushing 15. Circumferentially spaced grooves 27 are formed in the piston 10 to accommodate castellated lock washer 26. Piston 10 is provided with circumferential threads (not shown) formed in the lands circumferentially spaced between grooves 27, for the purpose of securing lock nut 25.

As is evident from the above description, bushing 15 is secured in rigid assembly with piston 10 by means of lock nut 25, lock washer 26, lip 18, and shoulder 21.

Figure 3:
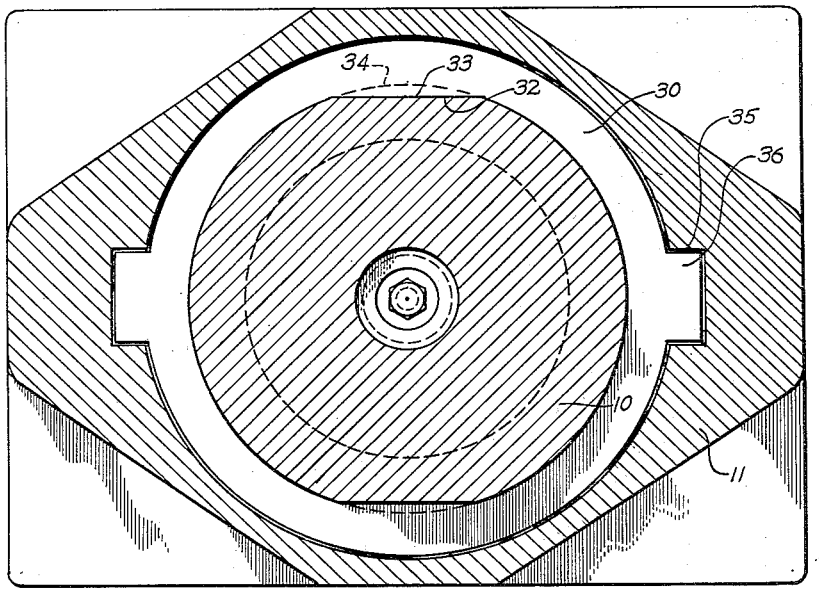
Fig. 3 is an axial section taken along line 3—3 of Fig. 2.

A lock plate 30, as best seen in Fig. 3, is placed axially within cylinder 11, abutting nut 23. In order to prevent possible rotary movement of piston 10 in cylinder 11, with consequent damage to seal 16, the longitudinal flats 32 are formed in piston 10 to cooperate with chordate portion 33 of lock plate 30 in axially sliding relationship; and lock plate 30 is further provided with ears 36 cooperating in fixed relationship with longitudinal grooves 35 formed in the walls of cylinder 11.

Referring again to Fig. 1, chordate portion 33 of lock plate 30 further acts as a stop to prevent axial separation of piston 10 and cylinder 11 beyond the desired stroke while handling and during assembly, abutting shoulder 34 of piston 10 to limit such separation. After mounting of the assembled draft gear on a vehicle carriage frame, piston 10 and cylinder 11 are maintained in assembled relationship by suitable mounting means not forming a part of this invention. Lock plate 30 is retained in assembled relation within cylinder 11 by means of externally-threaded nut 31 engaged by threads 24 of cylinder 11.

Figure 4:
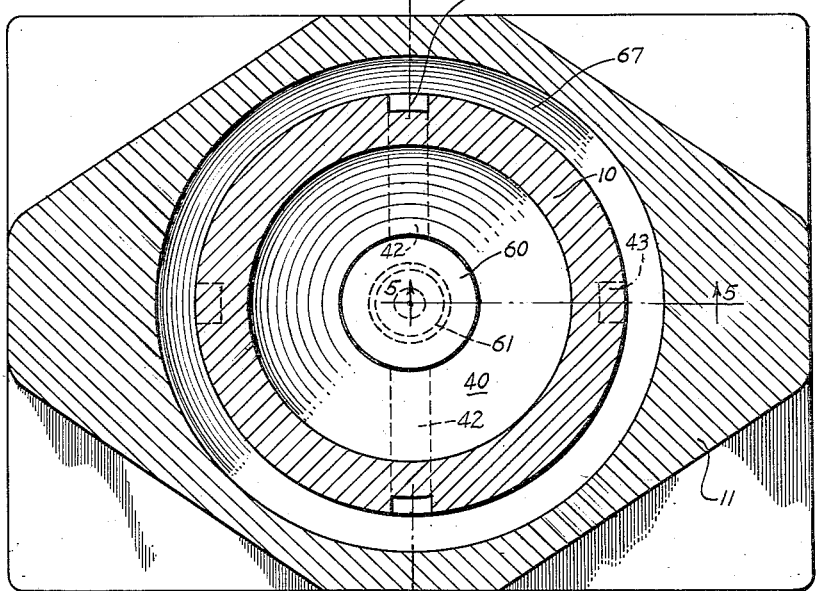
Fig. 4 is an axial section taken along line 4—4 of Fig. 1.

Piston 10, which may be integrally cast or formed from several parts welded together, is provided with internal chamber 40, passage 41, a pair of conically disposed, circumferentially spaced passageways 42, a pair of longitudinally disposed grooves 42$^a$, and a pair of longitudinal, circumferentially spaced tapered groove passageways 43 shown in Fig. 5, which are spaced circumferentially between grooves 42$^a$. Passageways 42, 42$^a$ and 43 are shown in cross-section in Fig. 4. Piston 10 is further provided with annular groove 44 and a series of radially disposed circumferentially spaced passages 45. Passages 45 register with a series of radially disposed circumferentially spaced passages 46 formed in bushing 15, which is further provided with an annular groove 47 about its periphery. Passages and grooves 44, 45, 46, 47 establish a flow path connecting chamber 40 with enclosure 48 contained within seal 16.

An expansible gas accumulator bag 50, formed of a flexible impervious material, is placed within chamber 40 through passage 41 prior to assembly of the draft gear. The remaining space within chamber 40 constitutes a hydraulic fluid reservoir. A fitting 51, having an internal gas valve, is inserted through stepped passage 53 formed in piston 10, and is assembled in threaded relationship with ring 55 and lock-nuts 52 to secure the accumulator in place. The accumulator is charged with gas to a suitable pressure through fitting 51, after which annular seal 57 is inserted in passage 53 and threaded cap 56 is placed in assembled relation with threads 54 formed in passage 53. The gas accumulator bag 50 and gas fitting 51, 52, 55 are of a type well known in the art, and form no part of the present invention.

After insertion of accumulator bag 50 in chamber 40, a threaded cap 62 may be inserted in passage 41 and secured by means of internal thread 65 formed in passage 41. A flanged member 60 is slidably mounted within an axial bore of cap 62, and is retained by means of snap-ring 63 against the axial bias of compression spring 61. Flanged member 60 protects accumulator 50 against possible damage due to contact with the walls of chamber 40, in the eventuality that the accumulator should expand abnormally due to uncontrollable accidental factors. A threaded cap 64 is secured to cap 62 within threaded bore 68, forming a smooth plane face for piston 10 and a stop for seat 60. Chambers and passages 66, 67 and 40—48 are filled with hydraulic fluid, and air is removed therefrom, by suitable means well known in the art (not shown).

Figure 2:
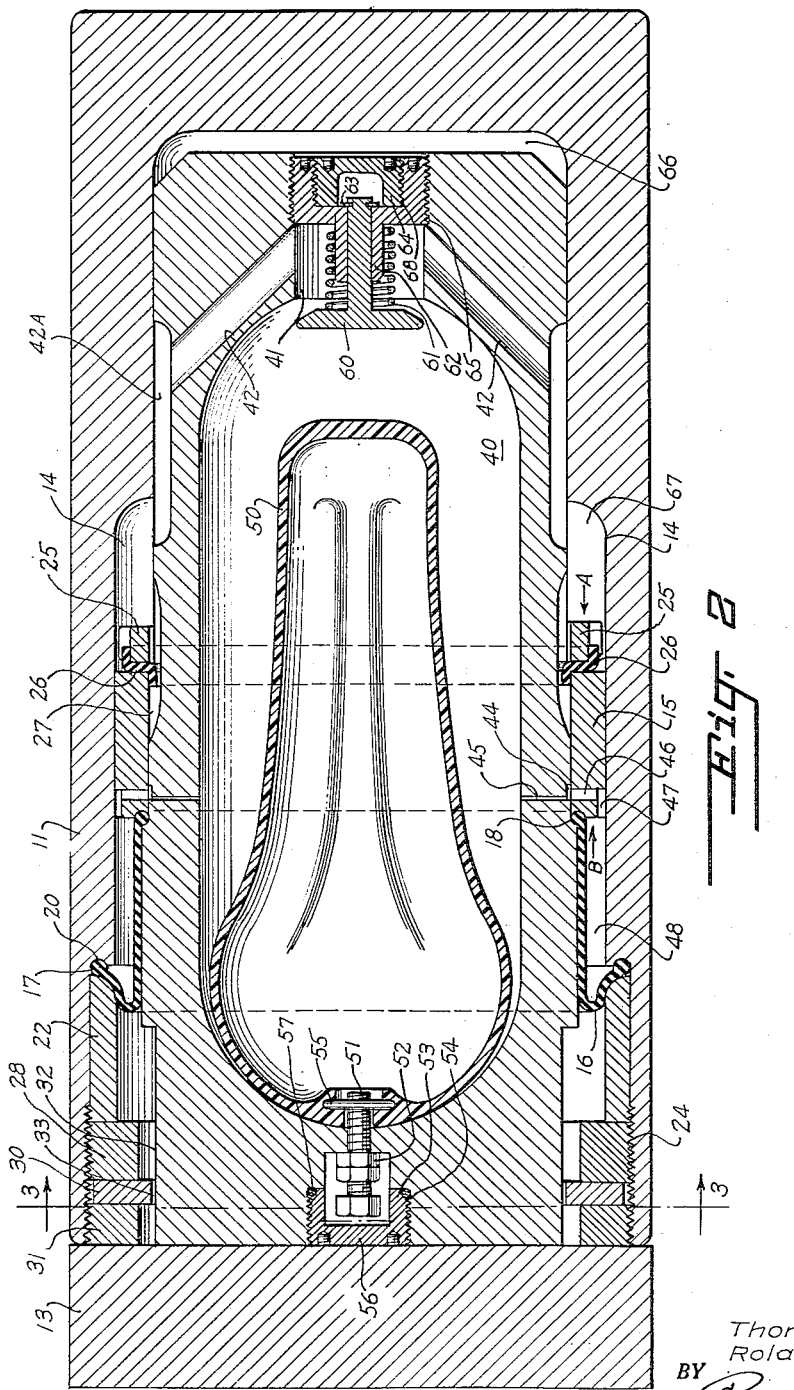
Fig. 2 is a longitudinal section of the same device, with parts shown in their relative positions when the device is subjected to a load.

Application of a load to the follower 13 in a direction tending to force piston 10 further into cylinder 11, toward the position of Fig. 2, results in a reduction of the volume of chamber 66. Fluid is forced through tapered passageways 43 and into space 67, through passageways 42$a$, 42 and 41 into space 40, through passages 44—47 and into space 48 contained within seal 16. Passageways 43 may be dimensioned suitably to absorb a substantial specified portion of the energy applied to the draft gear by follower 13, in accordance with designed load capacity of the draft gear; and are tapered in such manner that a constant force will persist between cylinder 11 and piston 10 throughout the stroke. As piston 10 travels further into bore 12, shoulder 69 formed by the intersection of bore 12 and bore 14 encloses smaller sections of passageway 43, effectively reducing the orifice area. The taper is such as to maintain a constant pressure in chamber 66 throughout the stroke of the piston and thus maintain a constan application of force.

Fluid forced into chamber 40 will compress accumulator bag 50 and the gas contained therein, thus storing potential energy in the accumulator bag to aid in performing a return stroke to the position of Fig. 1, after removal of the applied load from follower 13. Compression of the accumulator bag and the contained gas also serves to absorb the remainder of the energy applied to the draft gear by follower 13, over and above the amount absorbed as a concomitant to fluid transfer under pressure through passageways 43.

By comparison of Figs 1 and 2, it will be obvious that the volume of enclosure 48 within seal 16 increases appreciably during the energy-absorption stroke of the piston. To prevent collapse of seal 16 upon itself, passages and grooves 44—47 are provided, as previously discussed; during the stroke, fluid enters enclosure 48 through these passages and grooves to prevent such an occurrence. During the return stroke, of course, the excess fluid in enclosure 48 escapes to chamber 40 by a return flow.

The arrangement of seal 16, bushing 15, groove 47, and space 67 also serves to provide an additional force tending to return the piston to the no-load position of Fig. 1, upon release of the load from follower 13. Referring to Fig. 2, arrow A represents the hydraulic force exerted upon bushing 15, partially through nut 25 and lock-washer 26, tending to aid the return stroke. Similarly, arrow B represents the hydraulic force exerted upon bushing 15 tending to resist the return stroke. The fluid pressures existing in enclosure 48 and space 67 will be substantially equal, so that the unbalanced force acting upon bushing 15 will be proportional to the difference in effective cross-sectional areas of bushing 15 axially acted upon by the hydraulic pressures acting in either direction. Investigation has revealed that the effective area is a function of the diameter of bore 12 and the mean diameter of seal 16. The fluid in space 67 acts on a materially larger cross-sectional area than does the fluid in enclosure 48, force A is correspondingly greater than force B, and an unbalanced force results, tending to assist rapid return of the piston to the normal or no-load position of Fig. 1.

As an effect of the work expended while the fluid is forced through passages 43, the temperature of the fluid will rise considerably. It would not be practical nor desirable to expose the accumulator bag and seal 16 to this high temperature oil. This device therefore allows the active fluid to mix with the relatively cool oil in chamber 67 and to come in contact with the relatively cool walls of cylinder 11, before it is directed through passages 42, where further cooling occurs before the fluid reaches reservoir 40. It should also be noted that disc 60 also serves the purpose of diverting the oil stream, as it enters the reservoir, thus preventing high velocity oil from striking the accumulator bag directly.

Another important feature in this device is that the high pressure chamber 66 is isolated from seal 16, which is thus protected from high pressure loads developed during impact. It should also be noted that seal 16 rolls on and off the surfaces to be sealed with no rubbing action and consequent high ratio of wear, which are associated with seals commonly used in connection with hydraulic devices.

What we claim is:

1. In a hydraulic draft gear comprising a piston and cylinder assembled for relative axial movement and defining a hydraulic fluid-confining chamber, an expansible hydraulic fluid reservoir formed in said piston, and throttling passageways interconnecting said chamber and said reservoir; the combination of an annular impervious flexible fluid seal affixed to said piston and to said cylinder and forming a fluid-filled enclosure in cooperation therewith, and passages interconnecting said enclosure with said reservoir, such that variation in the volume of said enclosure, consequent upon said relative axial movement of said piston and said cylinder, will be accompanied by a compensating fluid transfer between said fluid enclosure and said reservoir through said passages.

2. In a hydraulic draft gear comprising a piston and cylinder assembled for relative axial movement, a hydraulic fluid-confining chamber formed in said cylinder, an expansible hydraulic fluid reservoir disposed in said piston, and throttling passageways interconnecting said chamber and said reservoir, such that said relative axial movement is constrained by hydraulic fluid transfer between said chamber and said reservoir through said throttling passageways; the combination of an annular impervious flexible fluid seal affixed at its inner periphery to said piston and at its outer periphery to said cylinder, and forming a fluid-filled enclosure in cooperation with portions of said piston and said cylinder; and passages interconnecting said fluid enclosure with said reservoir, such that variation in the volume of said fluid enclosure, consequent upon said relative axial movement of said piston and said cylinder, will be accompanied by a compensating fluid transfer between said fluid enclosure and said reservoir through said passages.

3. In a hydraulic draft gear comprising a piston and cylinder assembled for relative axial movement, a hydraulic fluid-confining chamber and an expansible hydraulic fluid reservoir, throttling passageways interconnecting said chamber and said reservoir, a flexible seal for the apparatus partially confining a fluid enclosure, and fluid passages connecting said enclosure with said reservoir; means for aiding rapid return of the piston from a first position assumed under an applied force to a second position upon removal of said applied force; said means comprising, in combination, an axial bore formed in said cylinder and enclosing an annular fluid-confining space surrounding said piston over a portion of its length, said throttling passageways connecting said chamber and said space, and an annular member affixed to said piston and having opposite radial faces axially confining said space and said enclosure, respectively; said radial face confining said space being or larger area than said radial face confining said enclosure, such that the resultant force exerted by fluid of approximately equal pressure upon said opposite radial faces will be in a direction aiding the return of said piston to said second position.

4. In a hydraulic draft gear, a cylinder formed with a first hydraulic fluid-confining axial bore and with a second superimposed hydraulic fluid-confining axial bore of larger diameter and shorter length, a piston cooperating along an end portion of its peripheral surface in axially slidable bearing engagement with said first bore, longitudinal circumferentially spaced grooves formed in said peripheral surface of said piston, a first group of said grooves being of tapered form and communicating with said first and second bores, a second group of said grooves communicating with said second bore, an expansible hydraulic fluid reservoir formed in said piston, and passageways connecting said reservoir with said second group of said grooves; whereby the areas of communication of said grooves with said second bore are varied by relative axial movement of said piston and said cylinder.

5. In a hydraulic draft gear, a cylinder formed with a first hydraulic fluid-confining axial bore and with a second superimposed hydraulic fluid-confining axial bore of larger diameter and shorter length, a piston cooperating along an end portion of its peripheral surface in axially slidable bearing engagement with said first bore, longitudinal circumferentially spaced grooves formed in said peripheral surface of said piston, a first group of said grooves being of tapered form and communicating with said first and second bores, a second group of said grooves communicating with said second bore, an expansible hydraulic fluid reservoir formed in said piston, and passageways connecting said reservoir with said second group of said grooves; whereby the minimum cross-sectional areas of communication between said first group of said grooves and said second bore defined by the co-operation of said first bore with said first group of said grooves, and the areas of communication of said second group of said grooves with said second bore, are varied by relative axial movement of said piston and said cylinder.

6. The combination of claim 5, together with an annular member affixed circumferentially to said piston and slidably engaging said second bore in fluid-tight relationship; an annular impervious flexible fluid seal affixed at its inner periphery to said piston and at its outer periphery to said cylinder, and forming a fluid-confining enclosure in cooperation with said piston, said cylinder, and said annular member; and passages interconnecting said fluid enclosure with said reservoir; such that variation in the volume of said enclosure, consequent upon relative axial movement of said piston and said cylinder, will be accompanied by a compensating fluid transfer between said enclosure and said reservoir through said passages.

References Cited in the file of this patent

UNITED STATES PATENTS

| | | |
|---|---|---|
| 713,691 | Schneider et al. | Nov. 18, 1902 |
| 1,936,788 | Hardy | Nov. 28, 1933 |
| 1,955,349 | Stevens | Apr. 17, 1934 |
| 2,187,625 | Mercier | Jan. 16, 1940 |

FOREIGN PATENTS

| | | |
|---|---|---|
| 1,113,867 | France | Oct. 22, 1954 |
| 528,569 | Germany | June 24, 1928 |
| 740,112 | Great Britain | Nov. 9, 1955 |